United States Patent
Hyde et al.

(10) Patent No.: US 8,415,835 B2
(45) Date of Patent: Apr. 9, 2013

(54) PLUG-IN POWER LINE CONDITIONER

(75) Inventors: Roderick A. Hyde, Redmond, WA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 116 days.

(21) Appl. No.: 12/660,527

(22) Filed: Feb. 26, 2010

(65) Prior Publication Data

US 2011/0210876 A1  Sep. 1, 2011

(51) Int. Cl.
*H02J 3/01* (2006.01)
(52) U.S. Cl. ............ 307/105; 307/89; 307/91; 307/122; 307/127; 307/137
(58) Field of Classification Search ............ 307/89–91, 307/105, 122–127, 138, 137, 147
See application file for complete search history.

(56) References Cited

U.S. PATENT DOCUMENTS

| | | | |
|---|---|---|---|
| 4,253,139 A * | 2/1981 | Weiss | 363/95 |
| 4,630,163 A | 12/1986 | Cooper et al. | |
| 5,136,455 A | 8/1992 | Billingsley | |
| 5,448,443 A | 9/1995 | Muelleman | |
| 5,528,123 A * | 6/1996 | Hutchison | 323/205 |
| 5,726,504 A | 3/1998 | Pecukonis et al. | |
| 5,872,531 A * | 2/1999 | Johnson et al. | 341/110 |
| 5,880,677 A * | 3/1999 | Lestician | 340/3.1 |
| 6,040,969 A * | 3/2000 | Winch et al. | 361/82 |
| 6,160,725 A | 12/2000 | Jansen | |
| 6,552,525 B2 * | 4/2003 | Bessler | 324/103 R |
| 6,618,232 B2 * | 9/2003 | Huang et al. | 361/93.2 |
| 6,891,487 B2 * | 5/2005 | Leung et al. | 341/120 |
| 7,139,180 B1 * | 11/2006 | Herbert | 363/124 |
| 7,598,844 B2 * | 10/2009 | Corcoran et al. | 340/12.32 |
| 7,633,782 B1 * | 12/2009 | Herbert | 363/125 |
| 7,714,663 B2 * | 5/2010 | Gong et al. | 330/310 |
| 8,022,660 B2 * | 9/2011 | Kinpara et al. | 318/812 |
| 2003/0202368 A1 | 10/2003 | Ierymenko | |
| 2006/0056127 A1 | 3/2006 | Lewis | |
| 2006/0285373 A1 | 12/2006 | Archer | |
| 2008/0002439 A1 | 1/2008 | Allinder | |
| 2008/0204303 A1 * | 8/2008 | Kamimura | 342/47 |
| 2009/0206949 A1 * | 8/2009 | Ebisawa | 333/167 |
| 2009/0322160 A1 | 12/2009 | DuBose et al. | |
| 2011/0090726 A1 * | 4/2011 | Brotto et al. | 363/131 |
| 2011/0169342 A1 * | 7/2011 | Tinaphong et al. | 307/126 |
| 2011/0215776 A1 * | 9/2011 | Sheen | 323/208 |

OTHER PUBLICATIONS

PCT International Search Report; International App. No. PCT/US 11/00380; bearing at date of Jul. 8, 2011; pp. 1-4.
"ECOsine™ Active FN 3420 / FN 3430 ECOsine™ Active Harmonic Filters"; Active Harmonic Filters, ECOsine™ Active-Schaffner EMC; 2 pages; bearing a date of May 31, 2010 printed on Jun. 18, 2010; located at: http://www.schaffner.com/components/en/ecosineactive/default.asp?level=3.

* cited by examiner

*Primary Examiner* — Linh Nguyen
(74) *Attorney, Agent, or Firm* — Bryan A. Santarelli; Graybeal Jackson LLP (57) ABSTRACT

A plug-in power line conditioner is configured to receive an AC voltage from a circuit and insert a correction signal onto the circuit.

55 Claims, 8 Drawing Sheets

PLUG-IN POWER LINE CONDITIONER

SUMMARY

According to an embodiment, a method for correcting an AC voltage waveform on a circuit includes receiving an AC voltage waveform from a circuit through an electrical outlet, generating a correction waveform configured to convert the AC voltage waveform to a corrected AC voltage waveform, and inserting the correction waveform onto the circuit through the electrical outlet. Optionally, the method may include drawing power from the electrical outlet.

According to an embodiment, an apparatus for modifying an AC voltage waveform includes an electrical plug, a sensor circuit operatively coupled to the electrical plug, a logic circuit operatively coupled to the sensor circuit and configured to output a correction signal, and a driver circuit operatively coupled to receive the correction signal from the logic circuit and output a corresponding correction waveform to the electrical plug. Optionally, the apparatus may include a charge storage apparatus configured to provide power to the sensor circuit, the logic circuit, and the driver circuit. Optionally, the charge storage apparatus may receive charge through a charger circuit also operatively coupled to the electrical plug.

According to an embodiment, a method for modifying an AC voltage waveform includes receiving an AC voltage waveform from an electrical circuit, receiving a synchronization signal, calculating a modification to the AC voltage waveform as a function of the synchronization signal, and inserting the modification to the AC voltage waveform onto the electrical circuit.

According to an embodiment, an apparatus for performing power line conditioning includes a voltage tap configured to receive an AC voltage from a circuit, a communication interface configured to receive at least a synchronization signal, and a logic circuit operatively coupled to the first voltage tap and the communication interface and configured to output a voltage correction signal responsive to signals received from the voltage tap and the communication interface.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
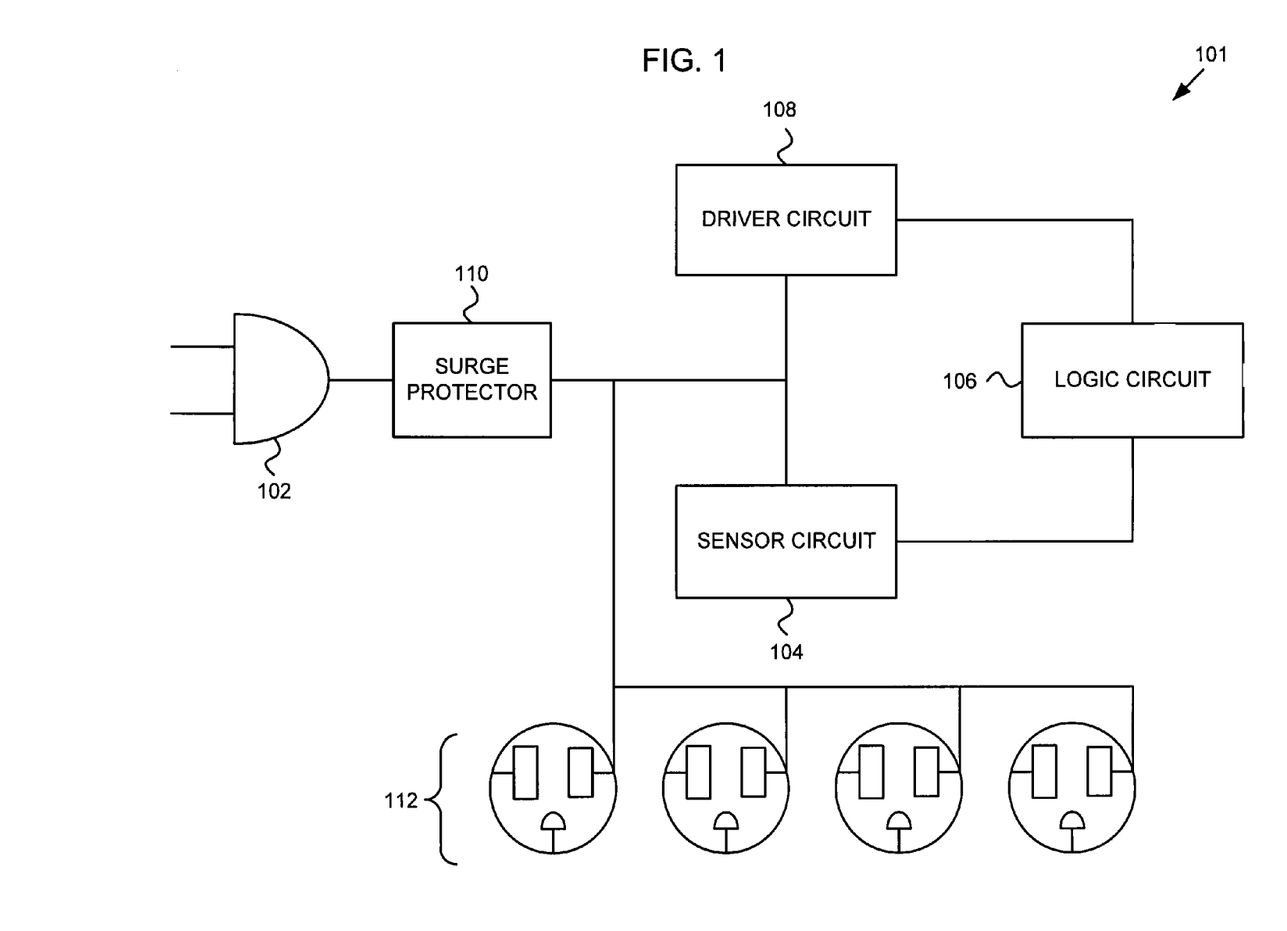
FIG. 1 is a block diagram of an apparatus for modifying an AC voltage waveform, according to an embodiment.

FIG. 1 is a block diagram of an apparatus 101 for modifying an alternating current (AC) voltage waveform, according to an embodiment. An electrical plug 102 may be configured to connect to a standard wall outlet. A sensor circuit 104 is operatively coupled to the electrical plug. The sensor circuit 104 is operable to sense voltage of an AC waveform (such as a 60 Hz power waveform, for example) on a circuit received by the electrical plug 102. A logic circuit 106 is operatively coupled to the sensor circuit 104 and is configured to output a correction signal. The correction signal corresponds to periodic voltage modifications needed to convert the AC waveform to a desired waveform. A driver circuit 108 is operatively coupled to receive the correction signal from the logic circuit 106 and output a corresponding correction waveform to the electrical plug 102. The correction waveform corresponds to the differences between a desired waveform and an actual waveform as determined by the logic circuit 106. When inserted onto the circuit through the plug 102, the correction waveform adds to the received waveform to place a desired waveform on the AC circuit (not shown) that provides the AC waveform to the plug 102.

Optionally, the apparatus 101 may be operable to receive current phase information via an interface (not shown) from another location on the AC circuit. For example a remote sensor may include a current sensor IC or a discrete circuit configured to sense current according to Ohm's law. The sensed current waveform may be compared to the sensed AC voltage waveform to determine any phase difference. A phase difference corresponds to a power factor error. The logic circuit 106 may provide a correction waveform that modifies the phase of the voltage to match the current phase to perform power factor correction.

Optionally, the apparatus 101 may include a surge protector 110 operatively coupled to one or more of the electrical plug 102, the sensor circuit 104, the logic circuit 106, and the driver circuit 108. The surge protector 110 may optionally be operatively coupled to other circuitry in the apparatus 101.

Optionally, the apparatus 101 may include a power strip including one or more AC outlets 112 operatively coupled to one or more of the electrical plug 102, the sensor circuit 104, the logic circuit 106, and the driver circuit 108. The power strip including one or more AC outlets 112 may optionally be operatively coupled to other circuitry in the apparatus 101.

Figure 2:
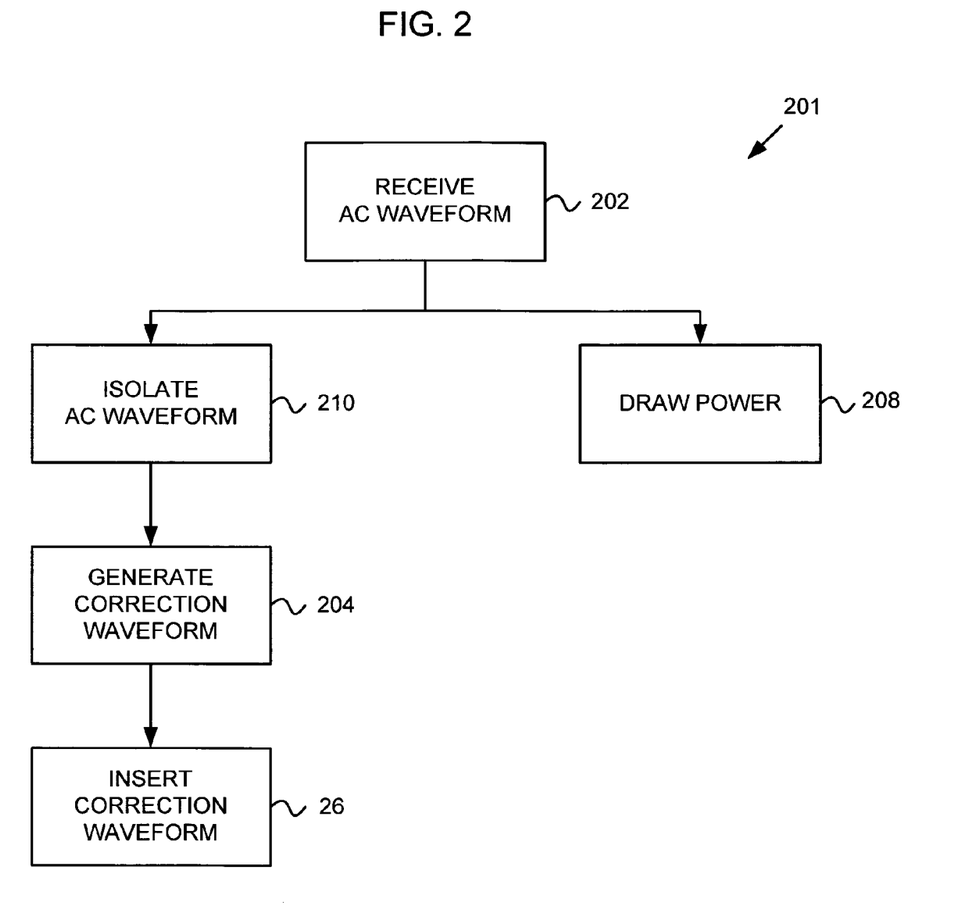
FIG. 2 is a flow chart illustrating a method for correcting an AC waveform on a circuit, according to an embodiment.

FIG. 2 is a flow chart illustrating a method 201 for correcting an AC voltage waveform on a circuit, according to an embodiment. The method 201 of FIG. 2 may be run on the apparatus 101 illustrated in FIG. 1, for example. The process 201 begins at step 202 by receiving an AC voltage waveform from a circuit through an electrical outlet. Proceeding to step 204, a correction waveform is generated. The correction waveform is configured to convert the AC voltage waveform received in step 202 to a corrected AC voltage waveform.

Proceeding to step 206, the correction waveform is inserted onto the circuit through the electrical outlet.

Optionally, the process 201 may include step 208, which may occur substantially continuously, wherein power is drawn from the electrical outlet. For example the power may be used to power circuitry used to generate and insert the correction waveform and/or to power other circuitry or mechanisms. For example, step 208 may include drawing power from the electrical outlet by tapping the AC waveform.

According to an embodiment, step 204 may be preceded by step 210. In step 210, the received AC voltage waveform may be converted into an isolated voltage waveform. For example, isolation may include AC-coupling the AC voltage waveform through a capacitor or an opto-coupler.

Figure 3:
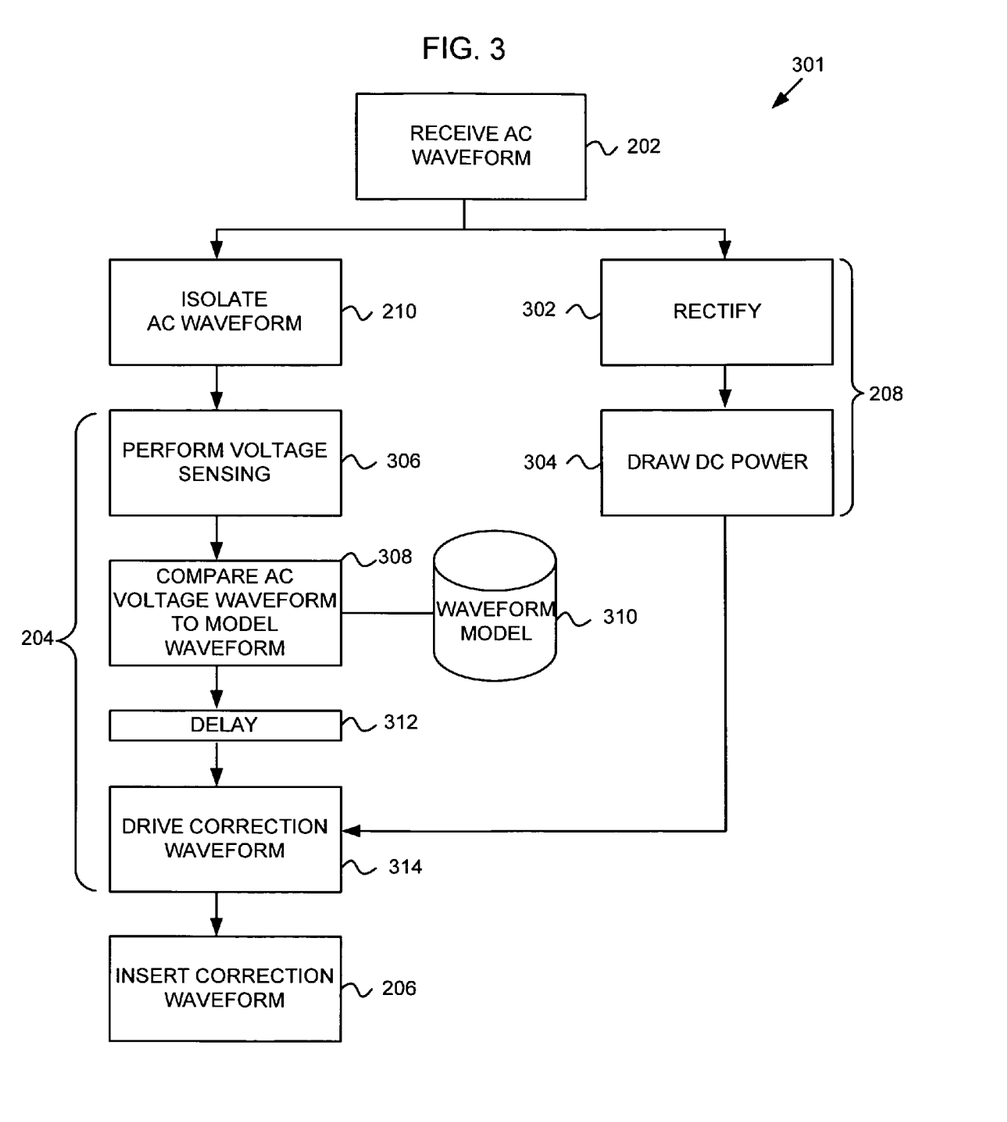
FIG. 3 is a flow chart showing an embodiment of the method of FIG. 2 including additional details.

FIG. 3 is a flow chart showing a method 301 including an embodiment of the method 201 of FIG. 2 including additional details. Step 208 may include tapping the AC voltage waveform and rectifying the AC voltage waveform 302 to a direct current (DC) voltage. As shown in step 304, circuitry may draw power from the rectified DC voltage. For example, step 208 may include charging a charge storage device, such as a capacitor or storage battery, for example, during at least a portion of a received AC voltage waveform cycle.

Referring to step 204, generating a correction waveform includes performing voltage sensing on the received AC voltage waveform, as shown in step 306. Proceeding to step 308, the sensed voltage comparing the AC voltage waveform to a model waveform 310. A model waveform 310 may be a sine wave or a multi-component wave. For example, step 204, 308 may include comparing the AC voltage waveform to a model waveform 310 and generating a residual voltage waveform including components opposite in sign from the deviations in the AC voltage waveform from the model waveform. According to an embodiment, the correction waveform is the residual voltage waveform. According to an embodiment, the correction waveform is a function of the residual voltage waveform. According to an embodiment, generating the correction waveform may include filtering the residual voltage waveform and the correction waveform may be a filtered function of the residual voltage waveform. According to an embodiment, generating the correction waveform may include taking one or more time derivatives of the residual voltage waveform, and the correction waveform may be a function of the one or more time derivatives of the residual voltage waveform. According to an embodiment, generating the correction waveform may include taking one or more time integrals of the residual voltage waveform, and the correction waveform may a function of the one or more time integrals of the residual voltage waveform.

Optionally, step 204 of process 301 may then proceed to step 312, wherein the correction waveform is delayed. For example, operations performed in step 308 may occur synchronously with receipt of the isolated AC voltage waveform, or may require an amount of time to perform. In embodiments where the amount of time to perform step 308 is significant with respect to synchronization with the isolated waveform, the correction waveform may be delayed one full cycle such that it is synchronized with the received AC voltage waveform.

Proceeding to step 314, the correction waveform is driven for insertion onto the circuit from which the AC voltage waveform was received in step 202. For example processing performed in step 308 may occur at low voltage such as by using low voltage digital circuitry. Step 314 may include amplifying the low voltage correction waveform to an amplitude corresponding to the received AC voltage waveform. Amplification may include amplifying to a nominal AC voltage such as 120. Alternatively, amplification may include amplifying to a scaled voltage similar to the amplitude of the received AC voltage waveform. In step 206, the correction waveform is then inserted back onto the circuit.

According to an embodiment, power for driving the correction waveform (and for running additional circuitry) may be drawn according to step 304 from rectified power tapped from the input line. Alternatively, all or a portion of the power to drive the correction waveform (and/or running the additional circuitry) may be provided by an independent power source.

Figure 4:
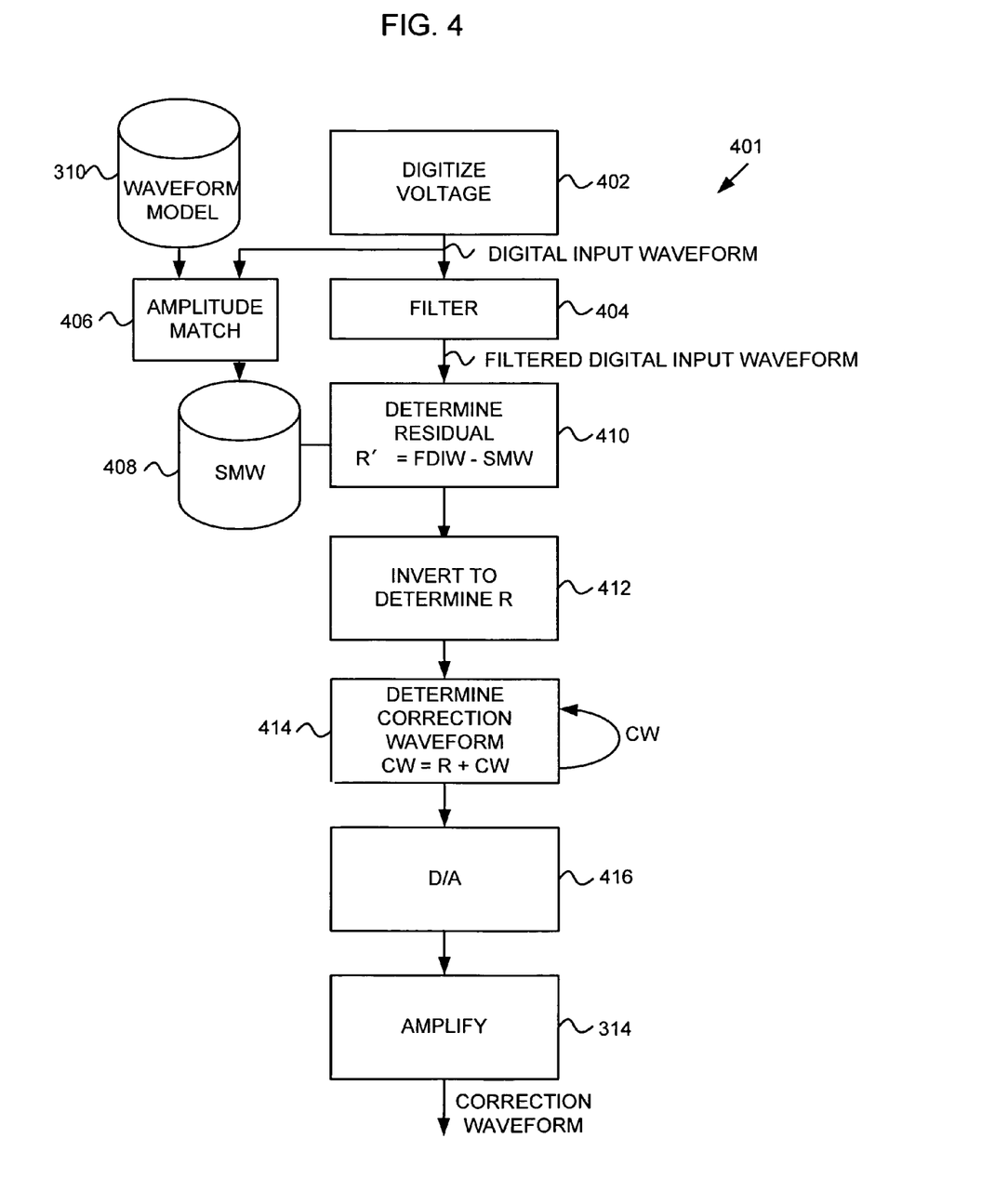
FIG. 4 is a flowchart illustrating a method for generating a correction waveform as shown in FIGS. 2 and 3, according to an embodiment.

FIG. 4 is a flowchart illustrating a method 401 for generating a correction waveform as shown by step(s) 204 in FIGS. 2 and 3, according to an embodiment. In step 402, a circuit such as an analog-to-digital converter digitizes the voltage of the received AC voltage waveform to produce a digital input waveform. The digital input waveform may optionally be filtered in step 404 to produce a filtered digital input waveform.

The digital input waveform produced in step 402 may optionally be scaled. For example the digital input waveform may be compared to a model waveform 310 in an amplitude matching step 406 to produce a scaled model waveform (SMW) 408. Optionally, filtering step 404 may include scaling the digital input waveform to match the model waveform 310. Accordingly, scaling processes performed in step 406 may alternatively be performed to produce a scaled digital waveform that may then be compared to the model waveform. For example, step 406 may include scaling at least one of the received AC voltage waveform or the model waveform 310 to make a time integrated voltage of the residual voltage waveform substantially equal to zero over a half-cycle of the received alternating current waveform. This may result, for example, in an average value of the residual voltage waveform to be substantially equal to zero over a plurality of each half-cycle of the received AC voltage waveform. Optionally, the comparison may result in an average value of the residual voltage waveform substantially equal to zero during each half-cycle of the received AC voltage waveform. For example, performing amplitude matching 406 to make a time integrated voltage of the residual voltage waveform substantially equal to zero, and/or an average value of the residual voltage waveform to be substantially equal to zero over a half-cycle may result in providing a corrected waveform onto the circuit that does not require the addition or removal of power from the circuit. For example, this may be used to avoid requiring an independent power source to maintain a target amplitude, but still provide significant value in "cleaning up" the AC voltage waveform on the circuit at its actual amplitude.

Proceeding to step 410, a residual waveform is determined as the difference between the digital input waveform or filtered digital input waveform and the model waveform or the scaled model waveform. For example, a residual waveform R' may be determined according to the relationship:

$$R' = \text{FDIW} - \text{SMW};$$

where,
FDIW is the filtered digital input waveform, and
SMW is the scaled model waveform.

If the scaled model waveform is subtracted from the filtered digital input waveform to determine the residual, then the result is inverted in step 412 to convert R' to R. Steps 410, 412, and 414 are shown in this way to make it easier to visualize the example shown in FIG. 5, described below.

Optionally, the residual waveform may be determined by subtracting scaled model waveform and the filtered digital input waveform according to the relationship:

$$R = SMW - FDIW;$$

where,

FDIW is the filtered digital input waveform,
SMW is the scaled model waveform, and
R is inverted with respect to R', described above.

If R is used in place of R', inversion step 412 may be omitted.

Accordingly, a residual digital waveform may corresponding to a difference between a scaled model waveform and the filtered digital input waveform or an inverted difference between the filtered digital input waveform and the scaled model waveform. According to the process described above, the residual waveform R represents only the uncorrected portion of the input waveform. The filter 404, the scaled model waveform 408 and/or additional filtering may provide a residual waveform R having a correspondence to actual variations in the received waveform appropriate to avoid resonant behavior or noise in the process 401. For example, the residual waveform R may optionally be scaled to a value sufficient to correct 50% to 80% of the error in the received waveform to produce a control that asymptotically approaches an ideal waveform. Typically, the filter 404 may operate to scale R for relatively large divergence from the model waveform and zero R at small divergence to avoid "hunting" or other oscillatory behavior in the process 401.

Proceeding to step 414, a correction waveform is determined. In step 414, the residual digital waveform R is added to a previous cycle digital correction waveform to produce a digital present cycle correction waveform CW. Step 414 is performed to take into account the possibility that the received waveform may already have a correction waveform CW superimposed on it. Thus, to make a predictable correction, the correction waveform takes into account the correction that already is present. Step 414 may include overwriting the previous cycle correction waveform with the present cycle correction waveform.

Alternatively, the previous digital CW may be subtracted from the digitized voltage received from step 402. In this case, the residual waveform corresponds to the entire correction needed for the received waveform, rather than just the residual error corresponding to corrections not previously made. In such an alternate case, step 414 may be omitted, and a step for subtracting the previous correction waveform from the received waveform added.

Proceeding to step 416, analog conversion is performed to convert the digital present cycle correction waveform to an analog correction waveform. Proceeding to step 314, the analog correction waveform is amplified to a voltage corresponding to the actual errors on the input AC voltage waveform to produce a correction waveform in preparation for insertion onto the circuit. Optionally, a digital driver circuit may drive an amplifier, and steps 416 and 314 may be combined.

According to embodiments, the correction waveform may be configured to apply at least one of phase correction, removal of harmonic content, frequency correction, converting from a multi-component wave into a sine wave, and/or converting from a sine wave into a multi-component wave. According to an embodiment, the correction waveform may be configured to apply power factor correction.

Typically, providing a residual voltage waveform substantially equal to zero over each half cycle may require that the input frequency and the correction waveform frequency be matched such that half-cycle phases are maintained in-phase.

According to embodiments, some types of corrections may be adaptable to substantially any circuit, such as including domestic wiring carrying an AC voltage waveform received from a power company. According to embodiments, other types of corrections may be better suited to isolated circuits, such as output from a generator, inverter, or other local power source.

Figure 5:
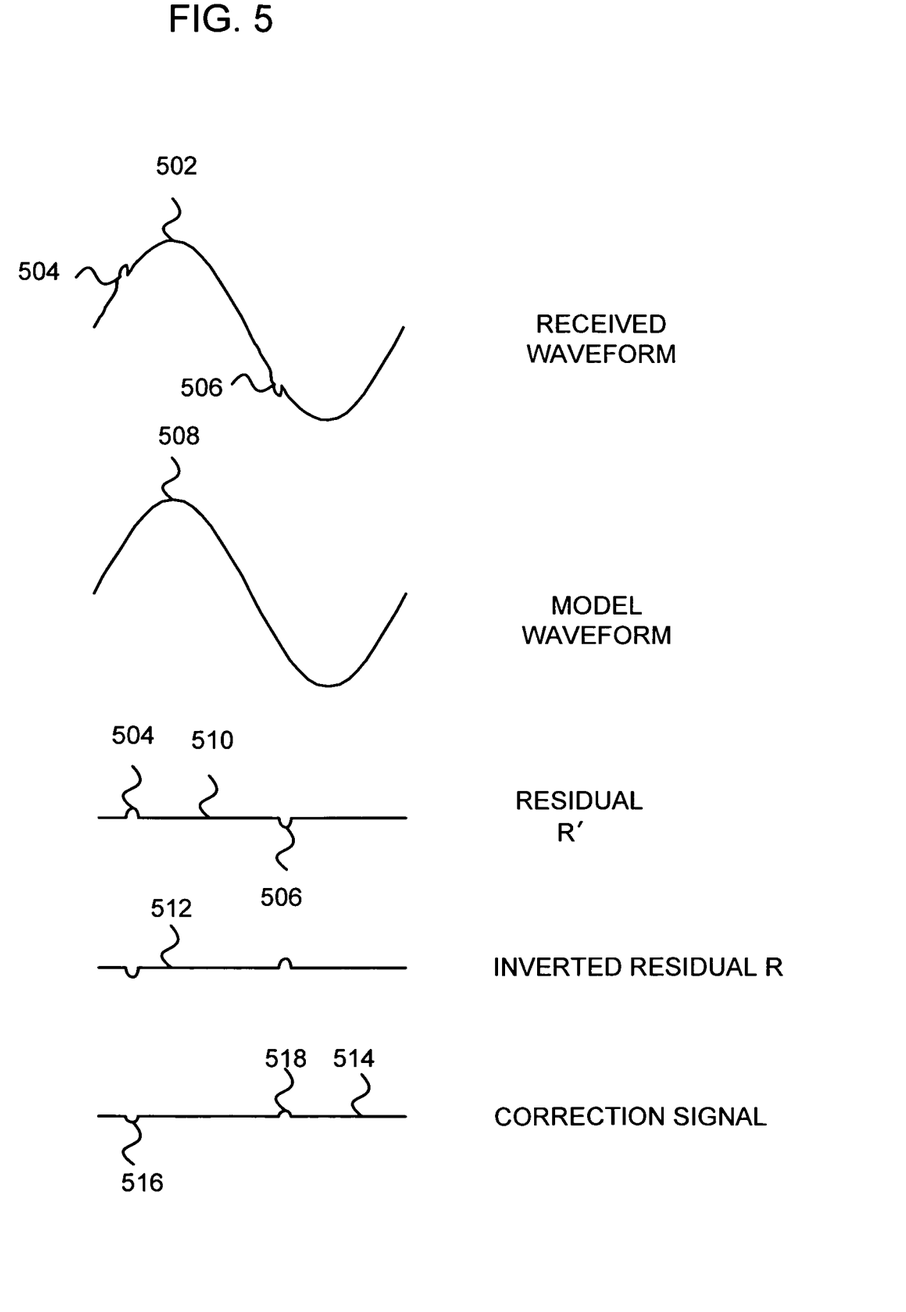
FIG. 5 shows several illustrative simplified waveforms in reference to FIG. 4, according to an embodiment.

Steps described in FIG. 4 may be visualized by reference to FIG. 5. FIG. 5 shows several illustrative simplified waveforms in reference to FIG. 4, according to an embodiment. A received AC voltage waveform 502 may include deviations from a desired AC voltage waveform. Such deviations may, for example, correspond to phase errors, harmonic content, frequency errors, correspondence to a multi-component wave when a sine wave is desired, or correspondence to a sine wave when a multi-component wave is desired. According to an embodiment, the deviations may correspond to a power factor error wherein the current phase and the voltage phase are different. The illustrative example of FIG. 5 shows deviations as periodic "glitches" 504, 506 that may, for example, correspond to switching noise exhibited as harmonic content from a motor or other power consumer that draws power from the circuit.

In comparison, waveform 504 is a model waveform that represents an ideal of what the received AC voltage waveform 502 is desired to look like. A residual waveform R' 510 represents the way that the received AC voltage waveform 502 differs from the model waveform 504. In this case, one can see that a periodic voltage glitch 504, 506 is present on each half-cycle of the received AC voltage waveform 502. The residual waveform R' 510 is inverted to form an inverted residual waveform R 512, representing the way in which voltage should be added to the received AC voltage waveform to correct it to approach the model waveform 508. A correction signal 514 corresponds to the inverted residual waveform R 512 and is similar but with reduced amplitude voltage glitches 516, 518 configured to reduce the magnitude of difference between the received AC voltage waveform 502 and the model waveform 508.

Figure 6:
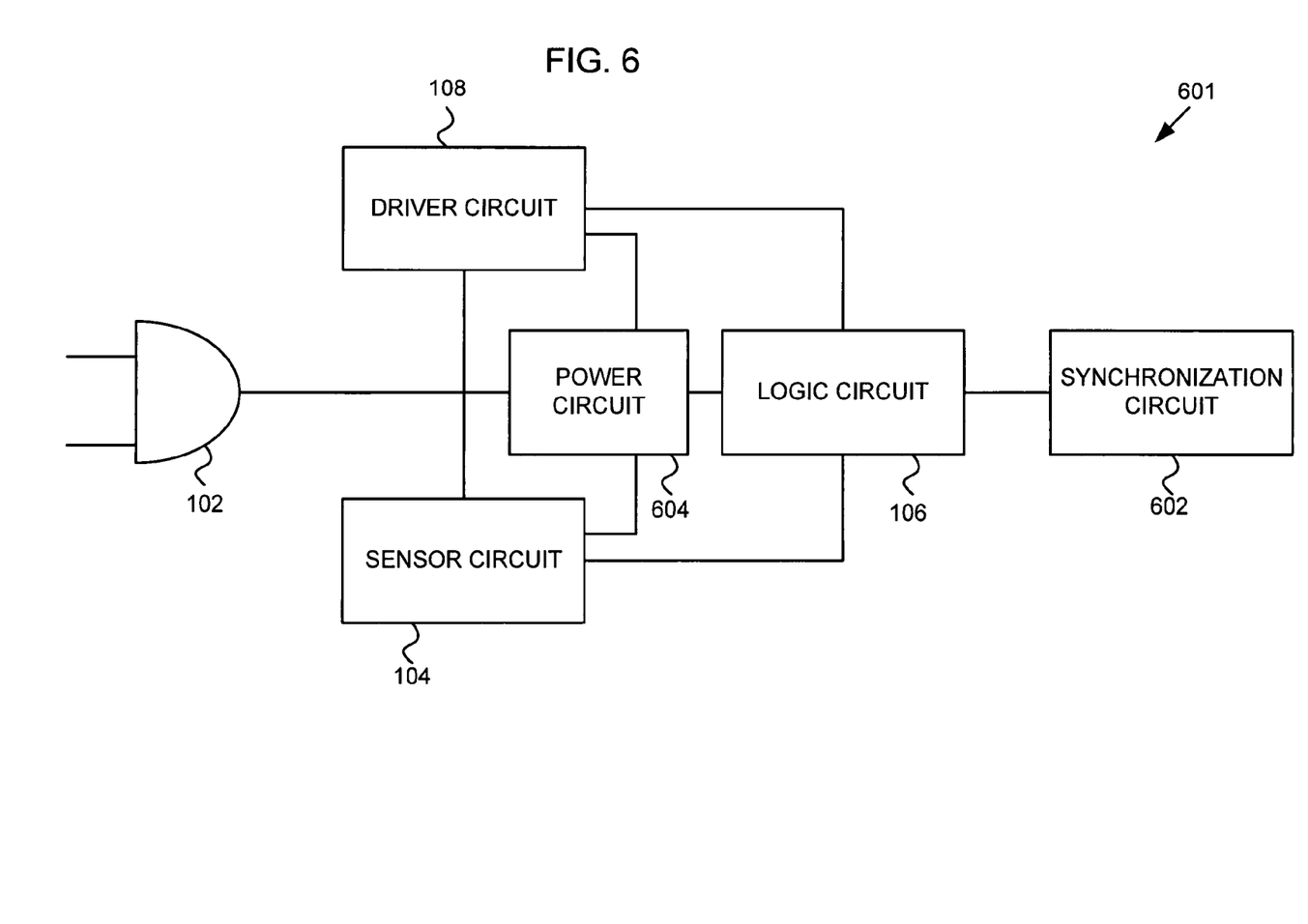
FIG. 6 is a block diagram of an apparatus configured to modify an AC voltage waveform, the apparatus including a synchronization circuit, according to an embodiment.

FIG. 6 is a block diagram of an apparatus 601 including a synchronization circuit 602, the apparatus being configured to modify an AC voltage waveform, according to an embodiment. As with the apparatus 101 of FIG. 1, an electrical plug 102 may be configured to connect to a standard wall outlet. A sensor circuit 104 is operatively coupled to the electrical plug. The sensor circuit 104 is operable to sense voltage of an AC voltage waveform (such as a 60 Hz power waveform, for example) on a circuit received by the electrical plug 102. A logic circuit 106 is operatively coupled to the sensor circuit 104 and is configured to output a correction signal. The correction signal corresponds to periodic voltage modifications needed to convert the received AC voltage waveform to a desired AC voltage waveform.

The synchronization circuit 602 may be configured to provide period, phase information or other information not included in the received waveform to the logic circuit 106. For example, for embodiments where the apparatus 601 is configured to apply phase correction to a waveform received through the plug 102, the synchronization circuit may provide a clock signal synchronized to a nominal phase, such as a phase at another location of the circuit or a phase of another circuit.

The synchronization circuit 602 may, for example, be used by the logic circuit 106 to select a phase or period of a model waveform. As described above, the logic circuit 106 then uses the synchronized model waveform as the target to which the received AC voltage waveform is driven. The synchronization circuit 602 may be configured to generate a synchronization signal, such as by dividing a clock signal out of a crystal oscillator. Alternatively or additionally, the synchronization circuit may include an interface configured to receive data or a synchronization signal from a remote resource.

A driver circuit 108 is operatively coupled to receive the correction signal from the logic circuit 106 and output a corresponding correction waveform to the electrical plug 102. The correction waveform corresponds to the differences between a desired waveform and an actual AC voltage waveform as determined by the logic circuit 106. When inserted onto the circuit through the plug 102, the correction waveform adds to the received AC voltage waveform to place a desired AC voltage waveform on the circuit.

The sensor circuit 104 may be configured to include a voltage tap for receiving an AC voltage from a circuit, such as through the plug 102 from an electrical outlet. The voltage tap may optionally provide power to a power circuit 604 configured to provide power to one or more of the sensor circuit 104, the logic circuit 106, the driver circuit 108, and/or the synchronization circuit 602.

The synchronization circuit 602 may include or consist essentially of a communication interface configured to receive at least a synchronization signal. The logic circuit may be operatively coupled to the first voltage tap, such as through the power circuit 604, and the synchronization circuit or communication interface 602. The logic circuit 106 is and configured to output a voltage correction signal responsive to signals received from the voltage tap and the communication interface.

The sensor circuit 104 may include an electrical isolation circuit between the logic circuit 106 and the voltage tap. Optionally, an electrical isolation circuit may be provided as a circuit separate from the sensor circuit 104. The electrical isolation circuit may protect the sensor circuit 104 from the line voltage and/or may protect the logic circuit 106 from voltage in the sensor circuit 104.

The driver circuit 108 may include an amplifier circuit configured to amplify the voltage correction signal for insertion onto the circuit. The power circuit 604 may include a charge storage device configured to receive charge from the circuit and output charge to the amplifier circuit, which may be incorporated into the driver circuit 108.

According to an embodiment, the plug 102 provides a signal connection configured to receive the AC voltage from the circuit and output the voltage correction signal to the circuit. Thus, the signal connection may be connected to the circuit via an electrical outlet. Optionally, the signal connection may be provided in an alternative embodiment such as two or more cables configured to connect to a circuit via wire nuts or alternative conventional connections.

The sensor circuit 104 may include a voltage sensor configured to sense voltage received at a voltage tap.

Figure 7:
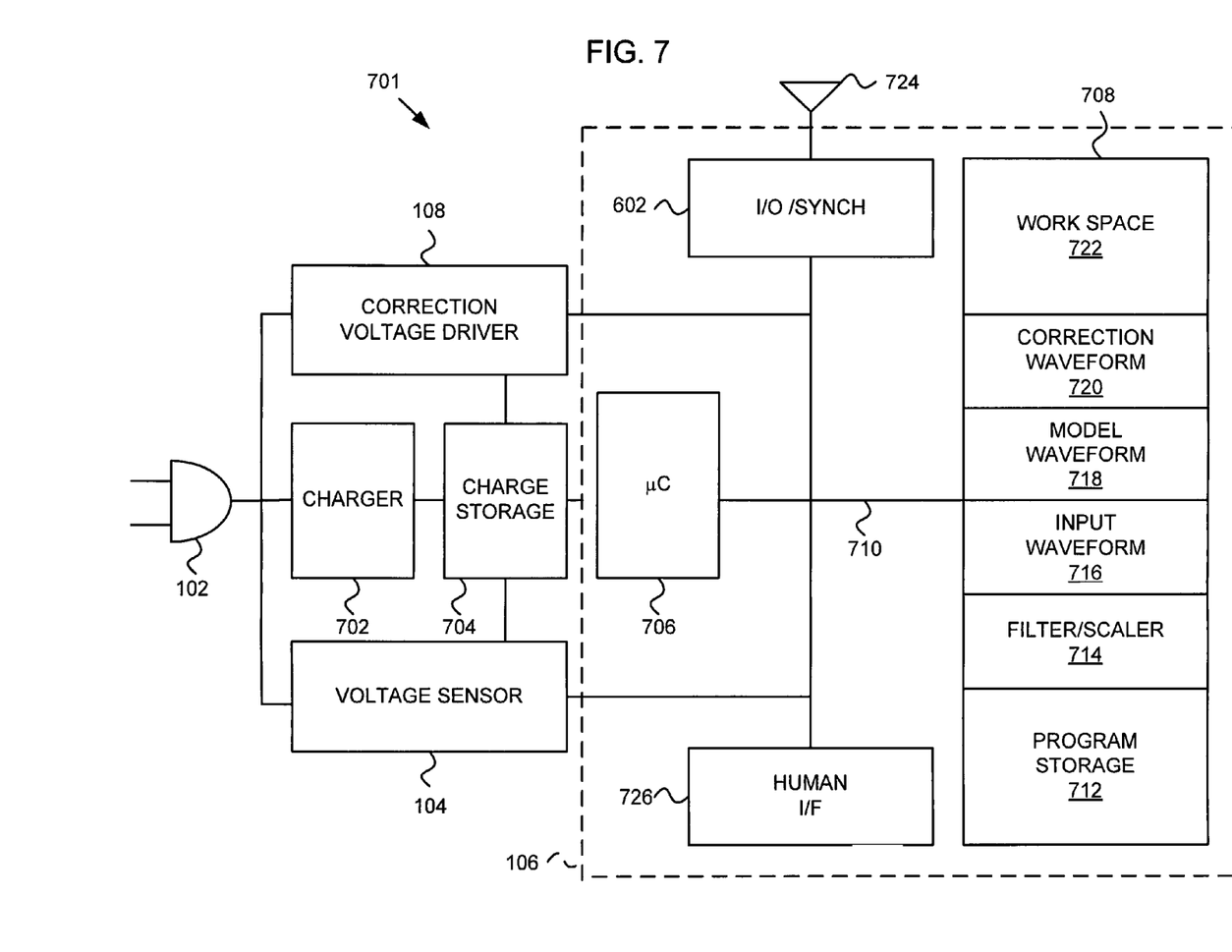
FIG. 7 is a block diagram of an apparatus configured to draw power from a circuit and to insert a correction signal onto the circuit to modify an AC voltage waveform, according to an embodiment.

FIG. 7 is a block diagram of an apparatus 701 configured to draw power from a circuit and to insert a correction signal onto the circuit to modify an AC voltage waveform, according to an embodiment. An electrical plug 102 may be configured to connect to a standard wall outlet. A sensor circuit 104 is operatively coupled to the electrical plug. The sensor circuit 104 is operable to sense voltage of an AC voltage waveform (such as a 60 Hz power waveform, for example) on a circuit received by the electrical plug 102. A logic circuit 106 is operatively coupled to the sensor circuit 104 and is configured to output a correction signal.

A correction voltage driver 108 is operatively coupled to receive the correction signal from the logic circuit 106 and output a corresponding correction waveform to the electrical plug 102. The correction waveform corresponds to the differences between a desired AC voltage waveform and an actual AC voltage waveform as determined by the logic circuit 106. When inserted onto the circuit through the plug 102, the correction waveform adds to the received AC voltage waveform to place a desired AC voltage waveform on the circuit.

A charger 702 is operatively coupled to receive power from the circuit through the plug 102. For example the charger 702 may draw power from the electrical plug and rectify the received AC voltage to one or more DC voltages. The charger 702 outputs charge to a charge storage apparatus 704 configured to provide power to the sensor circuit 104, the logic circuit 106, and the driver circuit 108. For example, the charge storage apparatus 704 may include at least one of a storage capacitor, a storage inductor, a storage cell, a battery, a rechargeable battery, or a non-rechargeable battery.

According to an embodiment, an electrical isolation circuit (not shown) may be included between the electrical plug 102 and the sensor circuit 104. Optionally, the sensor circuit 104 may include an integral electrical isolation circuit. The electrical isolation circuit (not shown) may isolate the sensor circuit 104 and/or logic circuit 106 from line voltage and allow them to operate at TTL or other logic voltage levels. The sensor circuit 104 is typically a voltage sensor circuit. The correction signal typically includes a voltage correction waveform.

The logic circuit 106 may include a microcontroller 706 operatively coupled to one or more physical memory devices organized as a computer readable memory 708 via a bus 710. Typically, the memory 708 may include a program storage section 712 that includes computer executable instructions. The memory may include a filter and/or scaler section 714 configured to filter and/or scale an input waveform received in an input waveform section 716 and/or a model waveform stored in a model waveform section 718. For example, the filter and/or scaler 714 may be embodied as an algorithm. For example, as described in conjunction with FIG. 4, the filter and/or scaler may scale the input waveform 716 and the model waveform 718 to one another to reduce or eliminate the need to supply net current to the correction waveform. The correction waveform may be output to a correction waveform memory section 720, where it may be delayed until synchronization to the next cycle, for example. According to another embodiment, the filter and/or scaler 714 may be embodied as one or more lookup tables (LUTs). Work space 722 may be provided performing calculations, caching data, etc. Optionally the memory 708 may be at least partially integrated into the microcontroller 706.

In operation, the logic circuit 106 may be configured to calculate a correction waveform by a process including subtracting a sensed waveform from a model waveform to determine a residual waveform, or subtracting the model waveform from the sensed waveform and inverting the difference to determine the residual waveform. The logic circuit 106 may be configured to scale the model waveform, filter the sensed waveform, or filter the residual waveform such that, over an alternating current half-cycle, the residual waveform includes positive integrated voltage versus time substantially equal to negative integrated voltage versus time. The logic circuit 106 may be configured to determine the correction waveform 720 by a process including adding the residual waveform to a previously calculated correction waveform 720. By updating previously calculated correction waveforms, for example, the logic circuit may be configured to respond to changes in a sensed voltage waveform over time. To avoid oscillations and/or other unstable behavior, the logic circuit filter 714 may include a filter configured to drive the logic circuit 106 to perform less than complete correction of a received voltage signal during a single alternating current cycle. Optionally, the logic circuit may be configured for accelerating at least a portion of a voltage correction by predicting a voltage deviation in a half-cycle from a voltage deviation in an earlier half-cycle, such as the previous (opposite sign) half-cycle or second previous (similar sign) half-cycle.

Optionally, the apparatus 701 may include a synchronization circuit 602 configured to generate a synchronization signal. For example, the synchronization circuit may be configured as a communications interface 602 configured to receive a synchronization signal. For example, the communications interface 602 may receive a synchronization signal via a wireless interface 724. Optionally, the communications interface 602 may receive a synchronization signal by extracting data from a power line communication signal received from the circuit via the plug 102. Optionally, a communications interface 602 may receive commands related to operation of the logic circuit 106 and/or report status or errors. Optionally, a communications interface 602 may be used for data communications and not provide a synchronization signal. Optionally, a synchronization circuit 602 may synthesize a synchronization signal responsive to the received input waveform 716.

As illustrated, the apparatus 701 may be configured to perform processing in the digital domain. Accordingly, the apparatus 701 may include an analog-to-digital converter configured to convert a sensed voltage waveform to a digital input waveform. The analog-to-digital converter may be integrated into the sensor circuit 104 and/or the logic circuit 106. The apparatus 701 may include a digital-to-analog converter configured to convert a digital voltage correction waveform 720 to an analog voltage correction waveform for amplification and insertion onto the circuit via the plug 102. Optionally, a digital-to-analog converter may be integrated into the correction voltage driver 108 and/or the logic circuit 106.

Optionally, the apparatus 701 may include a human interface 726 configured to receive an operational configuration and/or output an operational status. For example, the human interface 726 may include one or more indicators such as LED indicators. Optionally, the LED indicators may be configured to make a first indication when the correction driver drives a positive voltage and make a second indication when the correction driver drives a negative voltage. Momentary indications may this provide feedback to a user to indicate the relative shape of a received waveform from the circuit and/or a corrected waveform 720 resulting form correction waveform insertion onto the circuit.

The logic circuit 106 may be configured to output a correction signal to remove harmonic content, convert from a sine wave to a multi-component wave, convert a multi-component wave to a sine wave, and/or perform phase correction. According to an embodiment, the logic circuit 106 may be configured to perform power factor correction.

Optionally, the synchronization circuit 602 may be configured to communicate with other apparatuses for modifying an AC voltage waveform. For example, the logic circuit 106 may be configured to cooperate with other apparatuses for modifying an AC voltage waveform that are plugged into the same circuit. For example, cooperation with other apparatuses for modifying an AC voltage waveform may include selecting a model waveform, synchronizing correction waveforms, or correcting only a portion of a sensed deviation from a model.

Figure 8:
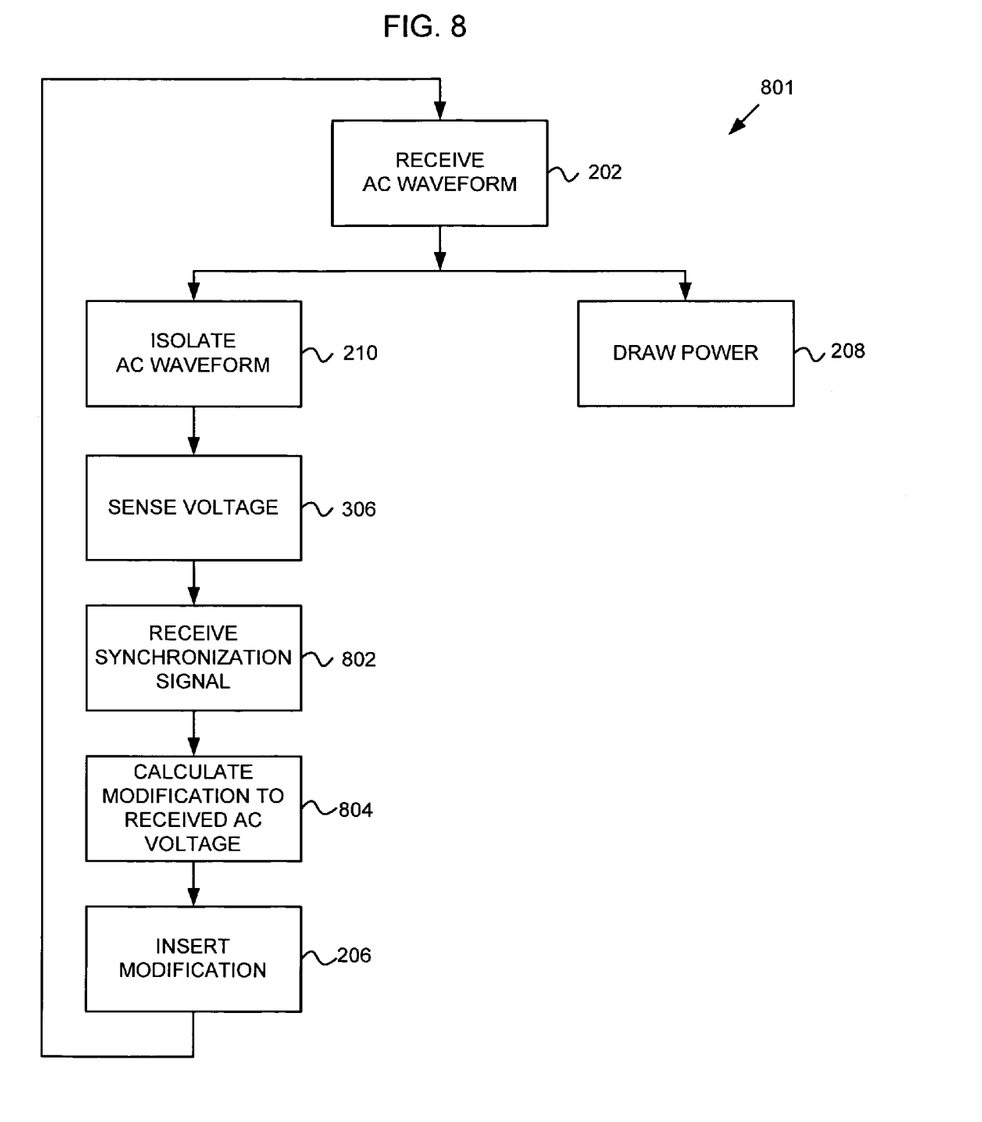
FIG. 8 is a flow chart illustrating a method for inserting a modification onto a circuit responsive to a received synchronization signal, according to an embodiment.

FIG. 8 is a flow chart illustrating a method 801 for inserting a modification onto a circuit responsive to a received synchronization signal, according to an embodiment. Referring to FIG. 8, the method 801 for modifying an AC voltage waveform includes step 202, receiving an AC voltage waveform from an electrical circuit. Proceeding to step 802, a synchronization signal is received. For example, the synchronization signal may be received from a synchronization circuit and/or data interface circuit 602 described in conjunction with FIGS. 6 and 7. Proceeding to step 804, a modification to the AC voltage waveform is calculated as a function of the synchronization signal. Proceeding to step 206, the calculated modification to the AC voltage waveform is inserted onto the electrical circuit. The AC voltage waveform and the modification to the AC voltage waveform may be respectively received from and inserted through the same electrical outlet. Inserting the modification to the AC voltage waveform 206 may include amplifying the calculated modification to the AC voltage waveform.

Optionally, method 801 may include step 208 wherein power is drawn from the received AC voltage. Amplification performed in step 206 may use the power drawn from the received AC voltage in step 208.

Calculating a modification to the received AC voltage waveform performed in step 804, as described above, includes performing voltage sensing on the received AC voltage waveform. Step 804 may further include filtering the inserted modification to the AC voltage waveform from the sensed voltage to determine an unmodified AC voltage waveform. Step 804 may further include combining the calculated modification to the AC voltage waveform with a previously calculated modification to the AC voltage waveform to converge on a modification to the AC voltage waveform. Inserting the modification to the AC voltage waveform 206 may include inserting the converged modification to the AC voltage waveform.

Optionally, calculating the modification as a function of the synchronization signal 804 may include calculating a phase correction. Optionally, calculating the modification as a function of the synchronization signal 804 may include calculating a partial correction configured to cooperate with modifications inserted onto the circuit by other apparatuses.

The foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The reader will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader may translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc; and may include systems having more than one of any of A, B or C, for example, $A_1$, $A_2$, and B, or A, $B_1$, $B_2$, $B_3$, and C). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for modifying an AC voltage waveform on a circuit, comprising:
   receiving an AC voltage waveform from a circuit through an electrical outlet;
   generating a correction waveform configured to convert the AC voltage waveform to a corrected AC voltage waveform; and
   inserting the correction waveform onto the circuit through the electrical outlet.

2. The method for modifying an AC voltage waveform on a circuit of claim 1, further comprising:
   drawing power from the electrical outlet.

3. The method for modifying an AC voltage waveform on a circuit of claim 2, further comprising:
   charging a charge storage device during at least a portion of a received waveform cycle.

4. The method for modifying an AC voltage waveform on a circuit of claim 1, further comprising:
   performing voltage sensing on the received AC voltage waveform.

5. The method for modifying an AC voltage waveform on a circuit of claim 1, further comprising:
   converting the AC voltage waveform into an isolated voltage waveform.

6. The method for modifying an AC voltage waveform on a circuit of claim 5, wherein converting the AC voltage waveform into an isolated voltage waveform includes AC-coupling the AC voltage waveform through a capacitor or an opto-coupler.

7. The method for modifying an AC voltage waveform on a circuit of claim 1, wherein generating a correction waveform includes comparing the AC voltage waveform to a model waveform.

8. The method for modifying an AC voltage waveform on a circuit of claim 7, wherein the model waveform is a sine wave or a multi-component wave.

9. The method for modifying an AC voltage waveform on a circuit of claim 1, wherein generating a correction waveform includes comparing the AC voltage waveform to a model waveform and generating a residual voltage waveform including components opposite in sign from the deviations in the AC voltage waveform from the model waveform.

10. The method for modifying an AC voltage waveform on a circuit of claim 9, wherein the correction waveform is the residual waveform.

11. The method for modifying an AC voltage waveform on a circuit of claim 9, wherein the correction waveform is a function of the residual waveform.

12. The method for modifying an AC voltage waveform on a circuit of claim 9, wherein the correction waveform is a function of one or more time integrals of the residual waveform.

13. The method for modifying an AC voltage waveform on a circuit of claim 9, further comprising:
   scaling at least one of the received AC voltage waveform or the model waveform to make a time integrated voltage of the residual voltage waveform over a half-cycle of the received AC voltage waveform substantially equal to zero.

14. The method for modifying an AC voltage waveform on a circuit of claim 9, wherein the comparison results in an average value of the residual voltage waveform substantially equal to zero over a plurality of each half-cycle of the received alternating current waveform.

15. The method for modifying an AC voltage waveform on a circuit of claim 1, wherein the correction waveform is configured to apply at least one of phase correction, removal of harmonic content, frequency correction, converting from a multi-component wave into a sine wave, or converting from a sine wave into a multi-component wave.

16. The method for modifying an AC voltage waveform on a circuit of claim 1, wherein generating a correction waveform further includes:
   digitizing the voltage of the received AC voltage waveform to produce a digital input waveform;
   filtering the digital input waveform to produce a filtered digital input waveform;
   determining a residual digital waveform corresponding to a difference between a scaled model waveform and the filtered digital input waveform or an inverted difference between the filtered digital input waveform and the scaled model waveform;
   adding the residual digital waveform to a previous cycle digital correction waveform to produce a digital present cycle correction waveform;

overwriting the digital previous cycle digital correction waveform with the digital present cycle correction waveform;
converting the digital present cycle correction waveform to an analog correction waveform; and
amplifying the analog correction waveform to produce the correction waveform.

17. The method for modifying an AC voltage waveform on a circuit of claim 1, further comprising:
receiving a current phase from an external sensor; and
wherein generating the correction waveform includes generating the correction waveform to change a voltage phase to match the current phase to perform power factor correction.

18. An apparatus for modifying an AC voltage waveform, comprising:
an electrical plug;
a sensor circuit operatively coupled to the electrical plug;
a logic circuit operatively coupled to the sensor circuit and configured to output a correction signal; and
a driver circuit operatively coupled to receive the correction signal from the logic circuit and output a corresponding correction waveform to the electrical plug.

19. The apparatus for modifying an AC voltage waveform of claim 18, further comprising:
a charge storage apparatus configured to provide power to the sensor circuit, the logic circuit, and the driver circuit.

20. The apparatus for modifying an AC voltage waveform of claim 19, further comprising:
a charger configured to draw power from the electrical plug and output charge to the charge storage apparatus.

21. The apparatus for modifying an AC voltage waveform of claim 19, wherein the charge storage apparatus includes at least one of a storage capacitor, a storage inductor, a storage cell, a battery, a rechargeable battery, or a non-rechargeable battery.

22. The apparatus for modifying an AC voltage waveform of claim 18, further comprising an electrical isolation circuit between the electrical plug and the sensor circuit.

23. The apparatus for modifying an AC voltage waveform of claim 18, wherein the sensor circuit is a voltage sensor circuit.

24. The apparatus for modifying an alternating current voltage waveform of claim 18, wherein the correction signal includes a voltage correction waveform.

25. The apparatus for modifying an AC voltage waveform of claim 18, wherein the logic circuit is configured to calculate a correction waveform by a process including subtracting a sensed waveform from a model waveform to determine a residual waveform, or subtracting the model waveform from the sensed waveform and inverting the difference to determine the residual waveform.

26. The apparatus for modifying an AC voltage waveform of claim 25, wherein the logic circuit is configured to scale the model waveform, filter the sensed waveform, or filter the residual waveform such that, over an alternating current half-cycle, the residual waveform includes positive integrated voltage versus time substantially equal to negative integrated voltage versus time.

27. The apparatus for modifying an AC voltage waveform of claim 25, wherein the logic circuit is configured to determine the correction waveform by a process including adding the residual waveform to a previously-calculated correction waveform.

28. The apparatus for modifying an AC voltage waveform of claim 18, wherein the logic circuit is configured to respond to changes in a sensed AC voltage waveform over time.

29. The apparatus for modifying an AC voltage waveform of claim 28, wherein the logic circuit includes a filter configured to drive the logic circuit to perform less than complete correction of a received voltage signal during a single AC cycle.

30. The apparatus for modifying an AC voltage waveform of claim 18, wherein the logic circuit is configured for accelerating at least a portion of a voltage correction by predicting a voltage deviation in a half-cycle from a voltage deviation in an earlier half-cycle.

31. The apparatus for modifying an AC voltage waveform of claim 18, further comprising:
a synchronization circuit configured to generate a synchronization signal.

32. The apparatus for modifying an AC voltage waveform of claim 18, further comprising:
a communications interface configured to receive a synchronization signal.

33. The apparatus for modifying an AC voltage waveform of claim 18, further comprising:
an analog-to-digital converter configured to convert a sensed voltage to a digital input waveform; and
a digital-to-analog converter configured to convert a digital voltage correction waveform to an analog voltage correction waveform.

34. The apparatus for modifying an AC voltage waveform of claim 18, further comprising:
a human interface configured to perform at least one of receive an operational configuration and output an operational status.

35. The apparatus for modifying an AC voltage waveform of claim 18, wherein the logic circuit is configured to output a correction signal to provide at least one of removing harmonic content, performing power factor correction, converting from a sine wave to a multi-component wave, converting a multi-component wave to a sine wave, or performing phase correction.

36. The apparatus for modifying an AC voltage waveform of claim 18, wherein the logic circuit includes a digital processor configured to determine a correction signal in the digital domain.

37. The apparatus for modifying an AC voltage waveform of claim 18, further comprising an interface configured to communicate with other apparatuses for modifying the AC voltage waveform.

38. The apparatus for modifying an AC voltage waveform of claim 37, wherein the logic circuit is configured to cooperate with other apparatuses for modifying the AC voltage waveform that are plugged into the same circuit.

39. The apparatus for modifying an AC voltage waveform of claim 18, further comprising:
a surge protector operatively coupled to one or more of the electrical plug, the sensor circuit, and the driver circuit.

40. The apparatus for modifying an AC voltage waveform of claim 18, further comprising:
a power strip including one or more AC outlets operatively coupled to one or more of the electrical plug, the sensor circuit, and the driver circuit.

41. A method for modifying an AC voltage waveform, comprising:
receiving an AC voltage waveform from an electrical circuit;
receiving a synchronization signal;
calculating a modification to the AC voltage waveform as a function of the synchronization signal; and
inserting the modification to the AC voltage waveform onto the electrical circuit.

42. The method for modifying an AC voltage waveform of claim 41, wherein the AC voltage waveform and the modification to the AC voltage waveform are respectively received from and inserted through the same electrical outlet.

43. The method for modifying an AC voltage waveform of claim 41, wherein inserting the modification to the AC voltage waveform includes amplifying the calculated modification to the AC voltage waveform.

44. The method for modifying an AC voltage waveform of claim 43, further comprising:
drawing power from the received AC voltage waveform;
wherein the amplification is performed using the power drawn from the received AC voltage waveform.

45. The method for modifying an AC voltage waveform of claim 41, further comprising:
performing voltage sensing on the received AC voltage waveform.

46. The method for modifying an AC voltage waveform of claim 45, further comprising:
combining the calculated modification to the AC voltage waveform with a previously calculated modification to the AC voltage waveform to converge on a modification to the AC voltage waveform; and
wherein the inserted modification to the AC voltage waveform includes inserting the converged modification to the AC voltage waveform.

47. The method for modifying an AC voltage waveform of claim 41, wherein calculating a modification to the AC voltage waveform as a function of the synchronization signal includes calculating a phase correction to the AC voltage waveform.

48. The method for modifying an AC voltage waveform of claim 41, wherein the synchronization signal corresponds to a current phase.

49. The method for modifying an AC voltage waveform of claim 48, wherein inserting the modification to the AC voltage waveform onto the electrical circuit includes inserting a modification to provide power factor correction.

50. An apparatus for performing power line conditioning, comprising:
a voltage tap configured to receive an AC voltage from a circuit;
a communication interface configured to receive at least a synchronization signal; and
a logic circuit operatively coupled to the voltage tap and the communication interface and configured to output a voltage correction signal responsive to signals received from the voltage tap and the communication interface.

51. The apparatus for performing power line conditioning of claim 50, wherein the voltage tap is configured to receive the AC voltage via an electrical outlet.

52. The apparatus for performing power line conditioning of claim 50, further comprising: an electrical isolation circuit between the logic circuit and the voltage tap.

53. The apparatus for performing power line conditioning of claim 50, further comprising:
an amplifier circuit configured to amplify the voltage correction signal for insertion onto the circuit.

54. The apparatus for performing power line conditioning of claim 53, further comprising a charge storage device configured to receive charge from the circuit and output charge to the amplifier circuit.

55. The apparatus for performing power line conditioning of claim 50, further comprising:
a voltage sensor configured to sense voltage received at the voltage tap.

* * * * *